US012751386B2

(12) United States Patent
Delgado Calvo-Flores et al.

(10) Patent No.: US 12,751,386 B2
(45) Date of Patent: Oct. 6, 2026

(54) INFILTRATOR DEVICE

(71) Applicant: UNIVERSIDAD DE GRANADA, Granada (ES)

(72) Inventors: Gabriel Delgado Calvo-Flores, Granada (ES); Juan Manuel Martin Garcia, Granada (ES); Raul Rojano Cruz, Granada (ES); Jose Angel Rufian Henares, Granada (ES)

(73) Assignee: UNIVERSIDAD DE GRANADA, Granada (ES)

( * ) Notice: Subject to any disclaimer, the term of this patent is extended or adjusted under 35 U.S.C. 154(b) by 312 days.

(21) Appl. No.: 17/606,609

(22) PCT Filed: Apr. 27, 2020

(86) PCT No.: PCT/ES2020/070264

§ 371 (c)(1),
(2) Date: Nov. 22, 2021

(87) PCT Pub. No.: WO2020/216982

PCT Pub. Date: Oct. 29, 2020

(65) Prior Publication Data

US 2022/0192112 A1 Jun. 23, 2022

(30) Foreign Application Priority Data

Apr. 26, 2019 (ES) ................................ P201930377

(51) Int. Cl.

| | |
|---|---|
| ***A01G 29/00*** | (2006.01) |
| *A01G 17/00* | (2006.01) |
| *A01G 27/02* | (2006.01) |

(52) U.S. Cl.
CPC .................................. *A01G 29/00* (2013.01)

(58) Field of Classification Search
CPC ................................................... A01G 29/00
(Continued)

(56) References Cited

U.S. PATENT DOCUMENTS 73,442 A * 1/1868 Fish ...................... A01G 29/00 47/48.5
349,874 A * 9/1886 Buhrer .................. A01G 29/00 405/43

(Continued)

FOREIGN PATENT DOCUMENTS

CN 105625549 A 6/2016
CN 107006349 A 8/2017

(Continued)

OTHER PUBLICATIONS

Original & Translation—ES 2673103, Jun. 2018.*

*Primary Examiner* — David J Parsley
*Assistant Examiner* — Angelica Alejandra Almeida Bonnin
(74) *Attorney, Agent, or Firm* — Hayes Soloway PC

(57) ABSTRACT

A device formed by a substantially cylindrical, permeable sheath with a filling of biochar particles. The whole sheath is water-permeable, and defines a bottom part intended to be buried into ground, and a top part, intended to stand out from the ground. The device, ensures the deep infiltration of rainwater, irrigation water or run-off, thereby preventing it from evaporating and optimising the use. A method for using the device is effective for increasing a crop yield.

22 Claims, 7 Drawing Sheets

(58) Field of Classification Search
USPC .................................................................. 47/9
See application file for complete search history.

(56) References Cited

U.S. PATENT DOCUMENTS

| | | | | | |
|---|---|---|---|---|---|
| 419,242 | A * | 1/1890 | Brown | A01G 29/00 | 405/39 |
| 1,194,027 | A * | 8/1916 | Kanst | A01G 29/00 | 405/50 |
| 1,276,887 | A * | 8/1918 | Eckart | A01G 13/32 | 405/38 |
| 1,971,390 | A * | 8/1934 | Van Yahres | A01C 21/00 | 206/0.5 |
| 2,380,721 | A * | 7/1945 | Brigden | A01C 21/00 | 206/0.5 |
| 3,460,562 | A * | 8/1969 | Moulder | E03C 1/046 | 137/268 |
| 3,755,966 | A * | 9/1973 | Smith | A01G 29/00 | 47/48.5 |
| 3,821,863 | A * | 7/1974 | Chan | A01C 21/00 | 47/48.5 |
| 3,900,962 | A * | 8/1975 | Chan | A01G 29/00 | 73/170.05 |
| 3,914,900 | A * | 10/1975 | Bigelow | A01G 13/32 | 47/9 |
| 4,175,356 | A * | 11/1979 | Allen | A01G 7/00 | 47/48.5 |
| 4,726,143 | A * | 2/1988 | Steinbeck | A01G 29/00 | 47/48.5 |
| 4,776,130 | A * | 10/1988 | West | A01C 21/00 | 47/48.5 |
| 5,533,300 | A * | 7/1996 | Kesler | A01G 29/00 | 47/74 |
| 5,761,846 | A * | 6/1998 | Marz | A01G 25/06 | 47/48.5 |
| 5,924,240 | A * | 7/1999 | Harrison | A01G 29/00 | 47/48.5 |
| 5,996,279 | A * | 12/1999 | Zayeratabat | A01G 29/00 | 47/48.5 |
| 6,192,623 | B1 * | 2/2001 | Higginbotham | A01G 29/00 | 47/48.5 |
| 6,540,436 | B2 * | 4/2003 | Ogi | A01G 29/00 | 239/201 |
| 6,984,090 | B2 * | 1/2006 | Allen | E03F 1/002 | 405/45 |
| 7,441,369 | B1 * | 10/2008 | McAtee | A01G 29/00 | 47/48.5 |
| 7,862,254 | B2 * | 1/2011 | Jin Hyun | A01G 27/006 | 405/51 |
| 8,371,065 | B2 * | 2/2013 | Peterson | A01G 29/00 | 47/48.5 |
| 8,978,296 | B2 * | 3/2015 | Zinger | A01G 29/00 | 405/45 |
| 2002/0134011 | A1 * | 9/2002 | Astle | A01G 27/00 | 47/48.5 |
| 2006/0112626 | A1 * | 6/2006 | Liu | A01G 25/06 | 47/48.5 |
| 2009/0175683 | A1 * | 7/2009 | Jin Hyun | A01G 29/00 | 405/44 |
| 2011/0056128 | A1 * | 3/2011 | King | A01G 29/00 | 47/48.5 |
| 2013/0219786 | A1 * | 8/2013 | Geerligs | A01G 29/00 | 47/48.5 |
| 2016/0066523 | A1 * | 3/2016 | Alfawaz | A01G 27/00 | 47/48.5 |
| 2017/0015601 | A1 | 1/2017 | Wilson et al. | | |
| 2018/0318893 | A1 * | 11/2018 | Roberts | C05D 9/00 | |
| 2019/0246575 | A1 * | 8/2019 | Hartman | A01G 24/60 | |
| 2025/0040497 | A1 * | 2/2025 | Lortscher | A01G 29/00 | |

FOREIGN PATENT DOCUMENTS

| | | | | | |
|---|---|---|---|---|---|
| CN | 109653329 | A | | 4/2019 | |
| DE | 3729893 | | * | 3/1989 | |
| DE | 3729893 | A1 | | 3/1989 | |
| DE | 19706828 | | * | 10/1998 | |
| DE | 19706828 | C1 | | 10/1998 | |
| KR | 19980072069 | A | * | 10/1998 | |
| KR | 20000053863 | A | * | 9/2000 | |
| KR | 20050067127 | A | * | 6/2005 | A01G 29/00 |
| KR | 200404997 | Y1 | * | 1/2006 | A01G 9/02 |
| KR | 20060033756 | A | * | 4/2006 | |
| KR | 101254076 | B1 | | 4/2013 | |
| WO | WO-2008129310 | A1 | * | 10/2008 | A01C 23/042 |
| WO | WO-2018138719 | A1 | * | 8/2018 | |

* cited by examiner

INFILTRATOR DEVICE

CROSS-REFERENCE TO RELATED APPLICATIONS AND PRIORITY

This patent application claims priority from PCT Patent Application No. PCT/ES2020/070264 filed Apr. 27, 2020, which claims priority from Spanish Patent Application No. P201930377 filed Apr. 26, 2019. Each of these patent applications are herein incorporated by reference in their entirety.

TECHNICAL FIELD

The present invention relates to a device for achieving greater infiltration and retention of water in the subsoil, as well as for achieving a localised irrigation and fertilization for woody crops and gardening. Greater oxygenation of the rhizosphere would furthermore be achieved. It is comprised among installations for obtaining, collecting or distributing water.

Its primary sector of application is the agricultural sector, especially the sector of olive tree cultivation, where it brings about considerable improvements both in the quantity and in the quality of olives. It can also be applied in ornamental plant maintenance and gardening and drainage systems to prevent surface puddling.

STATE OF THE ART

The problem of using water for irrigation systems currently has a number of solutions.

For example, pond systems are well-known, but these end up losing their function due to the deposition of clay layers at the base of the microbasin, so that infiltration drops as said pond becomes impermeable, producing over time problems of lack of oxygen in the area of the pond.

Moreover, a large quantity of water used in current irrigation systems is lost due to solar evaporation, producing an increase in the salinisation of the soil due to the precipitation of salts in the irrigation area.

There are also systems, such as the one described in patent [CN105625549], which describes a device and mechanism for collecting rainwater, but focusing on urban areas with applications in ornamental gardening.

The closest state of the art known to the applicant is reflected in [US2017015601] and [CN105625549], which describe methods of applying biochar on soils for the retention of rainwater following, for the installation thereof, processes such as digging and insertion into the soil at a certain depth.

[KR 20060033756] describes a method for manufacturing pellets formed by a cluster of very small biochar particles (obtained from carbonised and ground straw), to which fertiliser is incorporated. These pellets are arranged inside a tubular device, formed by a palm fibre sheath, and are buried in the soil. However, these pellets break down with moisture, leaving the device integrated in the ground and reducing the porosity, so while this approach is useful for providing fertilisers, the infiltration of water into the subsoil is limited and rapidly reduced as the pellets break down. Furthermore, the sheath of the device, which is capillary, facilitates the evaporation of the infiltrated water.

[KR101254076] also describes a method for manufacturing pellets based on biochar particles using an aqueous adhesive to facilitate the water solubility thereof.

[DE19706828] describes a device consisting of a cylindrical cartridge with holes filled with fertiliser, wherein said device is introduced into the ground to facilitate the nutrition, oxygenation and infiltration of water. In a particular embodiment, said device also comprises a mesh which allows the contents inside the cartridge to be replaced. However, it does not disclose the use of biochar.

[DE3729893A1] describes an irrigation stake consisting of a long tube that is permeable to water through holes and is filled with a high capillarity mass, preferably rock wool or glass wool. However, said high capillarity presents a serious problem since it can turn the device into a desiccant of deep soil during seasons where there is a high surface evaporation. In addition to this drawback, fragmented rock wool, glass fibre or glass wool present high risks due to inhalation that would make their handling and implantation in the environment dangerous.

BRIEF DESCRIPTION OF THE INVENTION

In order to solve the aforementioned problems, a device, hereinafter "device of the invention", which ensures the deep infiltration of rainwater, irrigation water or run-off, thereby preventing it from evaporating and optimising the use thereof, is proposed.

In a particular embodiment, the device of the invention also facilitates the incorporation of nutrients into the plant.

The device of the invention has the following advantages, and although some of them solve technical problems associated with known solutions, as a whole represent a significant improvement with respect to said solutions:

- Greater use of rainwater and run-off, storing it at a depth and not in the form of layers, as occurs in conventional crop systems. In the medium term, this use is greater due to the interconnection between the device and the roots of the plant, which allows a circulation of rainwater and run-off towards the root area of the plant, thereby achieving deep and effective irrigation. Also, as a result of the infiltration through the vertical walls of the sheath of the device, the deposition of sediments in the preferred device-root pathways is minimised.
- Drastic reduction of erosion as a result of the elimination of run-off water in the biochar infiltrators.
- Remediation of desertification as a result of an efficient use of water resources, by facilitating the infiltration of the captured rain below the area of direct evaporation due to the action of the sun, so that said water can be used by the desired crop and can even reload aquifers in the region. In the medium term, it can produce an oasification of the area where it is implanted.
- Increase in water tables as a result of the infiltration of high quantities of run-off water through biochar infiltrators. More water resources are thereby available both for natural and agricultural uses, and for urban and industrial use.
- Disappearance of contaminated run-off water. With the use of the device of the invention, an efficient use of fertilisers and chemicals, which would no longer be lost due to said run-off, would be achieved.
- Drastic reduction in the loss of nutrients and increase in soil fertility as erosion is prevented and complete infiltration of the rainwater is achieved. Furthermore, biochar physically and chemically improves said soil, as it is capable of forming nutritional reservoirs, forming structures suitable for holding microorganisms due to its high porosity, preventing losses of nitrogen due to volatilisation, etc.

- Sequestration of the $CO_2$ that would be emitted into the atmosphere, being buried and fixed in the form of biochar.
- Increase in the organic matter in the soil since biochar is a way to fix organic matter in the soil in a stable manner.
- Increase in the quantity of carbon in the soil with positive implications on the physicochemical fertility thereof, because biochar is a stable form of carbon over time on a human scale.
- Water resources would be increased, and productivity thereby improved. For example, in the olive tree grove there is a direct relationship between oil production and rainfall, such that dry years are usually related to years with low productions just as rainy years are usually related to large productions. This drop in productivity is prevented with an improved rainwater-based water efficiency.
- Promoting the sustainable management of agricultural waste by enhancing the use of waste in the form of biochar. Biofuels and energy would also be obtained from this waste. The use of biochar would also represent a way of returning the resources extracted from the soil to said soil.
- Additionally, the use of the device of the invention in gardening facilitates the breathing of the roots and helps with deep irrigations.
- The device of the invention, with a biochar filling, has a high hydraulic conductivity, so water goes through the cartridge virtually at the same speed at which it enters.
- Biochar retains more water than glass wool or rock wool and prevents water evaporation from the soil better once it is implanted. A mass made of a capillary material, such as glass fibre or rock wool, would act as a desiccant during dry seasons.

However, the main advantage derived from the use of the device of the invention is in the significant increase in the production of crops located in the environment thereof. When said device is used in olive tree plantations, the production of oil from these trees surprisingly increases, being tripled during dry years.

DETAILED DESCRIPTION OF THE INVENTION

Definitions

Within the scope of interpretation of the present invention, “biochar” will be understood as a set of vegetable carbon or carbon particles obtained from a biomass processed by pyrolysis. The word “biochar” comes from the words bio and charcoal, “vegetable carbon”, and is also referred to as “biocarbon”. In equivalent embodiments, a set of particles of any porous material that is stable over time and presents a porosity similar to vegetable carbon can be considered “biochar”.

Examples of materials making up biochar are the carbon obtained from holm oak firewood and from pruning waste of the olive tree grove.

Where the term “size” or “diameter” in reference to a particle is used in the description, it shall refer to the maximum distance between any two points of the particle.

The term “comprises” may also be interpreted in a particular embodiment as “consists of”. The term “comprises” and its variants do not intend to exclude other technical features, additives, components or steps. For those skilled in the art, other objects, advantages and features of the invention will be inferred in part from the description and in part from putting the invention into practice.

Device of the Invention

Figure 1:
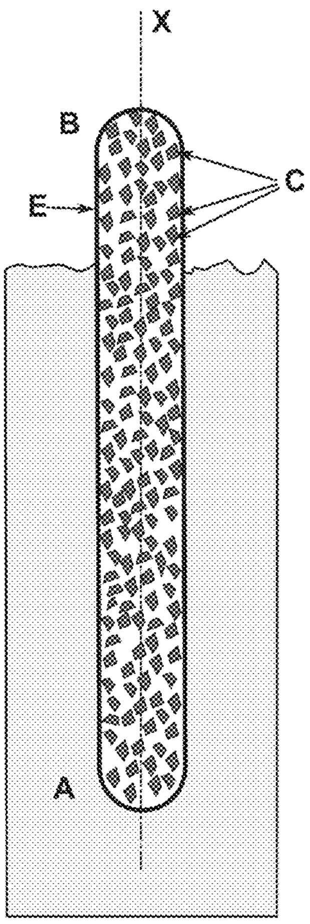
FIG. 1.—Schematic depictions of the device of the invention, wherein A represents its bottom part, which will be located at a greater depth, B the upper part thereof and X the longitudinal axis of the device. C represents the biochar and E the permeable sheath containing said biochar.

The first aspect of the present invention is a device, hereinafter “device of the invention” (FIG. 1) for facilitating the infiltration of water into the ground, comprising biochar (C) arranged in a substantially cylindrical, water permeable sheath (E).

The device of the invention is buried or half-buried in the ground such that the longitudinal axis of the device (X) is located substantially perpendicular to the ground, and its bottom part (A) is located at a greater depth than the upper part (B) thereof.

In a particular embodiment, the sheath of the device of the invention has a size comprised between 5 and 40 cm in diameter, more preferably between 10 and 20 cm in diameter, and between 10 and 200 cm in length, more preferably between 50 and 100 cm in length, even more preferably around 70 cm in length.

In another particular embodiment, preferred for the application of the device of the invention in tree or shrub crops, particularly in olive tree groves, the minimum size of said device is 10 cm in diameter by 50 cm in length, preferably between 10 and 20 cm in diameter and between 50 and 100 cm in length, thereby achieving the infiltrate in a suitable quantity and at a suitable depth.

In another particular embodiment, the size of the biochar particles is comprised between 2 and 100 mm, preferably between 5 mm and 30 mm, more preferably, around 20 mm.

Although the device of the invention works properly with biochar particles comprised in the range of 2-100 mm, over time and after sediment deposition episodes, using biochar particles measuring more than 20 mm and preferably with sizes between 30 mm to 60 mm has been the most useful.

In that sense, in another preferred embodiment, the size of the biochar particles is comprised between 20 mm and 100 mm, more preferably between 30 and 60 mm.

In a particular embodiment, the sheath has openings, holes or pores with a diameter comprised between 1 and 50 mm, preferably between 2 and 10 mm, more preferably around 2 mm.

In another particular embodiment, the sheath is made of a mesh with an internode space comprised between 1 and 50 mm, preferably between 5 and 50 mm, even more preferred with an internode space of around 10 mm.

The sheath can be manufactured in plastic, metal or organic material. However, in a preferred embodiment, the sheath consists of a mesh manufactured in organic material, preferably jute or hemp.

By using organic material, the buried area of the sheath will degrade such that plant roots can go through it and be distributed among the biochar, causing said biochar to ultimately be integrated into the ground. In the sheath of jute or hemp, the device of the invention will degrade in about 5 years, although it would present problems associated with the capillarity of the material, which would render its use in keeping moisture in the subsoil less efficient.

In another preferred embodiment, the device of the invention comprises a plastic mesh. This embodiment would be more durable than the biodegradable one. A new device would simply have to be inserted in the event of mechanical breakage of the mesh or its collapse due to sediments because of the lack of erosion control.

With these technical features, the device of the invention ensures the deep infiltration of rainwater, irrigation water or run-off, thereby preventing it from evaporating and optimising the use thereof.

In a particular embodiment, the device of the invention comprises fertilisers, plant growth promotors or other agrochemicals inside the sheath, preferably absorbed by the biochar. By way of example, humus, coffee grinds or derivatives, chemical fertilisers, etc., can be used, which, once placed inside the sheath, can be released closer to the roots of the plant, achieving a localised fertilization.

In a preferred embodiment, the device comprises deblocking agents and chelates. In a more preferred embodiment, the device of the invention comprises deblocking fertiliser inside the sheath.

Figure 2:
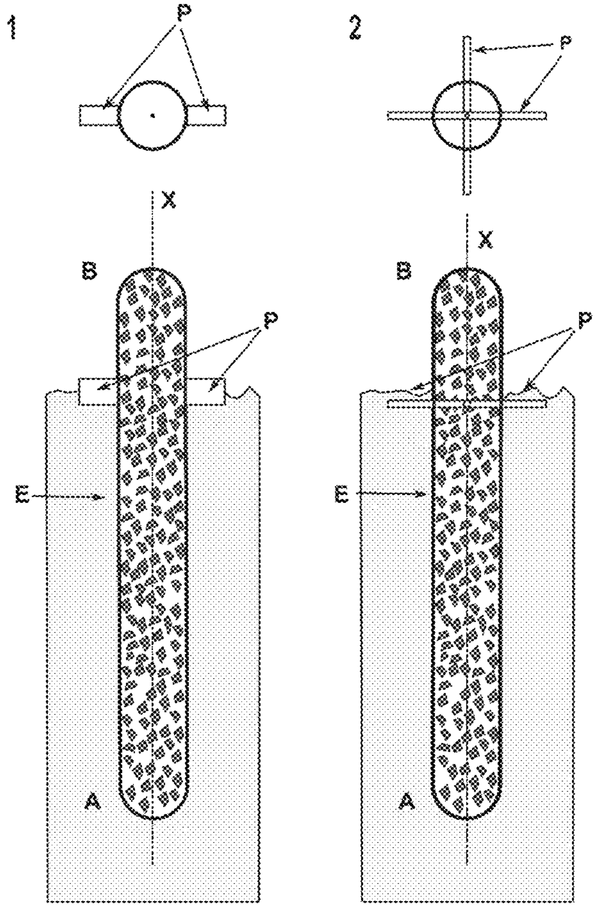
FIG. 2.—Schematic depictions of two embodiments in which P represents elements projecting from the sheath E for preventing the device of the invention from sinking and facilitating the placement thereof.

In another particular embodiment (FIG. 2), the device of the invention comprises one or more elements (P) in the upper part (B) thereof projecting from the sheath, thereby preventing the device from sinking and facilitating its placement. These elements can be located at a certain distance from the upper end of the device so that it remains half-buried, such that the upper end is not entirely covered when the device is buried.

In a preferred embodiment (FIG. 2.1, 2.2), these elements (P) are a plurality of bars going through the sheath in a manner substantially perpendicular to its longitudinal axis (X).

Figure 3:
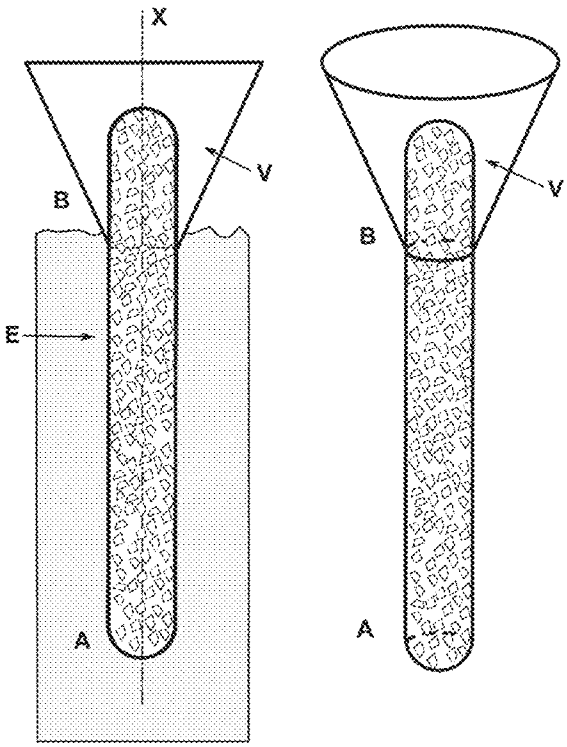
FIG. 3.—Schematic depiction of an embodiment in which V represents a frustoconical element located in the upper part B of the device of the invention.

In another particular embodiment (FIG. 3), the device of the invention further comprises a substantially frustoconical element (V) fixed at its smaller base to the upper part (B). Preferably, the frustoconical element will have a smaller base with a diameter similar to the diameter of the sheath.

This particular embodiment of the device of the invention allows to add water or fertilisers to the biochar once the device is buried, preventing direct contact of the product with the surface of the soil and possible nutrient lockouts in said surface. It also allows to protect the upper part of the sheath against possible run-offs and thereby preventing the clogging of the device at times with a high sediment load.

Figure 4:
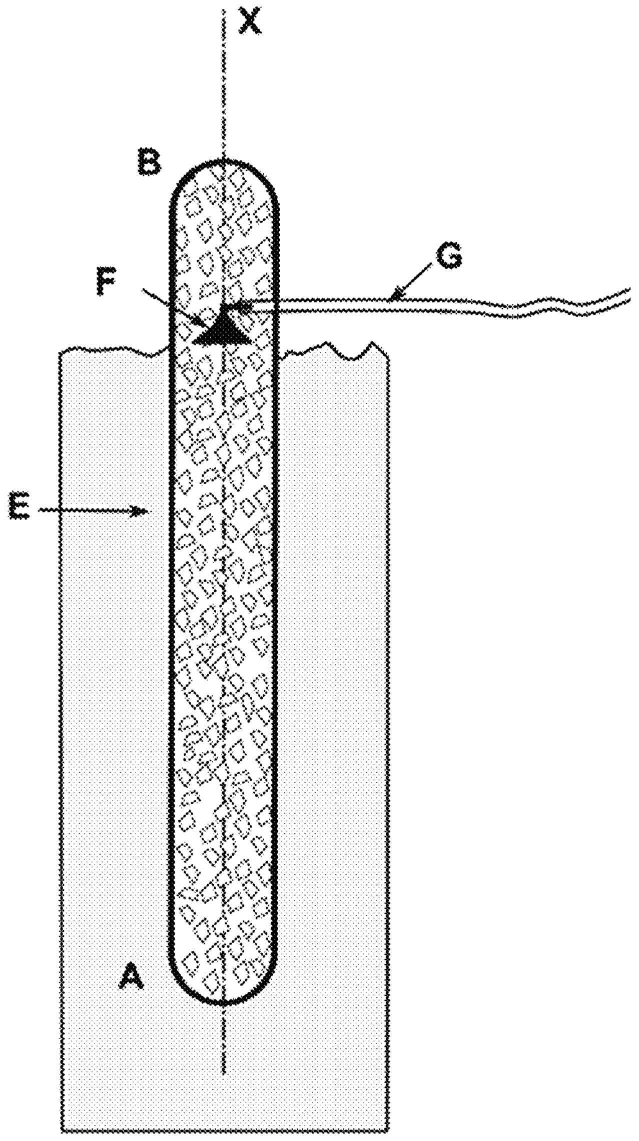
FIG. 4.—Schematic depiction of an embodiment in which G represents a conduit connecting the inside and the outside of the sheath E, and F a dripper or diffuser FIG. 5.—Schematic depiction of an embodiment in which R represents a dome which prevents water evaporation.

In another particular embodiment (FIG. 4), the device of the invention further comprises a conduit (G), suitable for conducting water, joining the inside of the sheath with the outside, such that when it is connected to a water intake, it allows to irrigate the biochar in a localised manner. Preferably, the device further comprises a dripper or diffuser (F), located inside the sheath and connected to the mentioned conduit.

Figure 5:
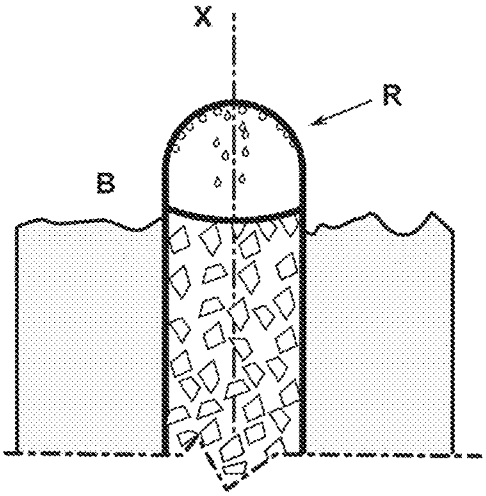

In another particular embodiment (FIG. 5), the device of the invention further comprises a dome (R) in its upper part (B), made of non-capillary material, which prevents the water from evaporating out and redirects it to the inside.

Figure 6:
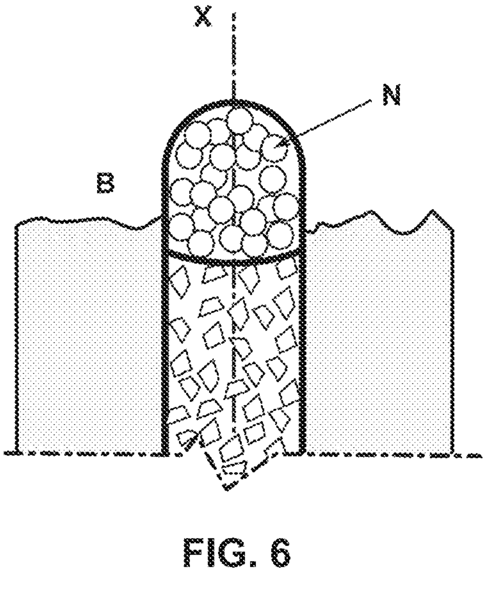
FIG. 6.—Schematic depiction of an embodiment in which N represents a set of particles made of non-capillary material.

In another particular embodiment (FIG. 6), the sheath of the device of the invention contains at least biochar, housed in the bottom part (A), and particles made of a non-capillary material (N) located in the upper part (B). This arrangement keeps said particles of non-capillary material on the surface, reducing the evaporation and maintaining the infiltration of water towards the biochar.

The particles of non-capillary material can be, by way of example, plastic balls, gravel, expanded polystyrene particles or pieces of pine bark, among other materials.

Tests have proven that using a non-capillary material for making the sheath also has a significant effect on water evaporation. Therefore, in a preferred embodiment, the sheath is made of a material with low or no capillarity, such as plastic or metal.

Figure 7:
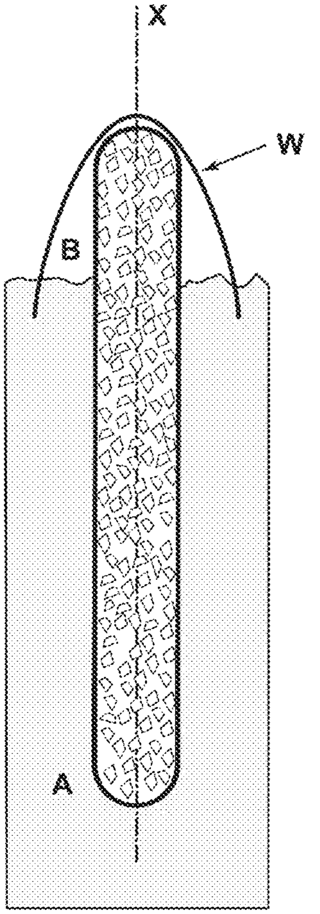
FIG. 7.—Schematic depiction of an embodiment in which W represents a permeable dome.

In another particular embodiment (FIG. 7), the device further comprises in its upper part a permeable dome (W), with a diameter greater than the diameter of the sheath (E), which allows to protect the sheath against possible damage and prevent clogging of the infiltrator at times with a high sediment load.

These permeable domes are preferably manufactured in a rigid material such as plastic, metal, wood, coconut or wicker.

System of the Invention

Figure 8:
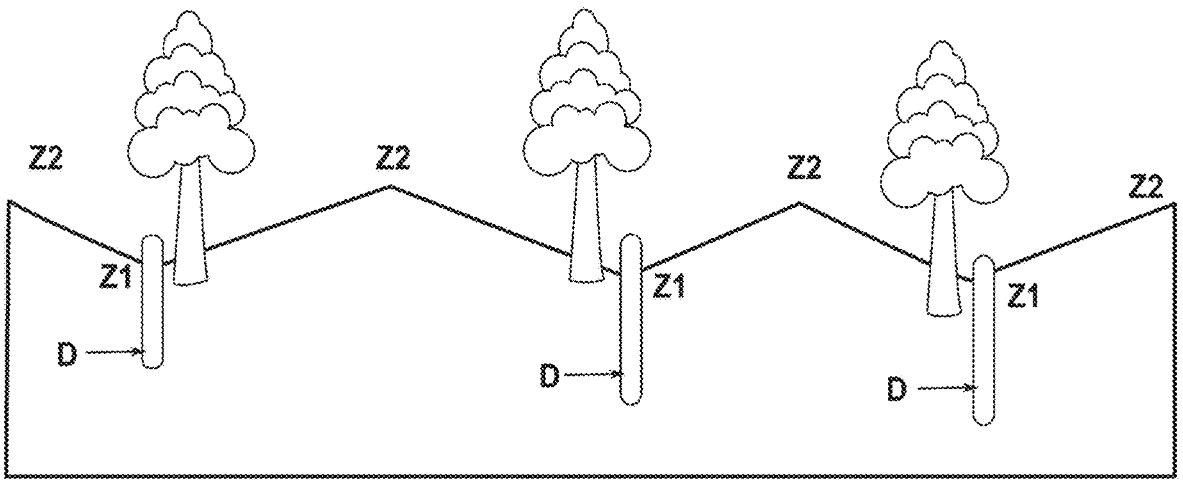
FIG. 8.—Schematic depiction of the system of the invention in which Z1 represents the areas with the lowest level, Z2 the areas with the highest level and D the device of the invention.

In a second aspect, the invention relates to a system (FIG. 8) for optimising the infiltration of water into the plant crop (preferably trees), comprising one or more devices of the invention (D), arranged in the ground surrounding the tree or plant, such that each device is located in areas with lower levels (Z1).

In a particular embodiment, the device or devices of the invention are located at a distance of less than 2 metres from the trunk or base of the plant, preferably at a distance of less than 1 metre.

Figure 9:
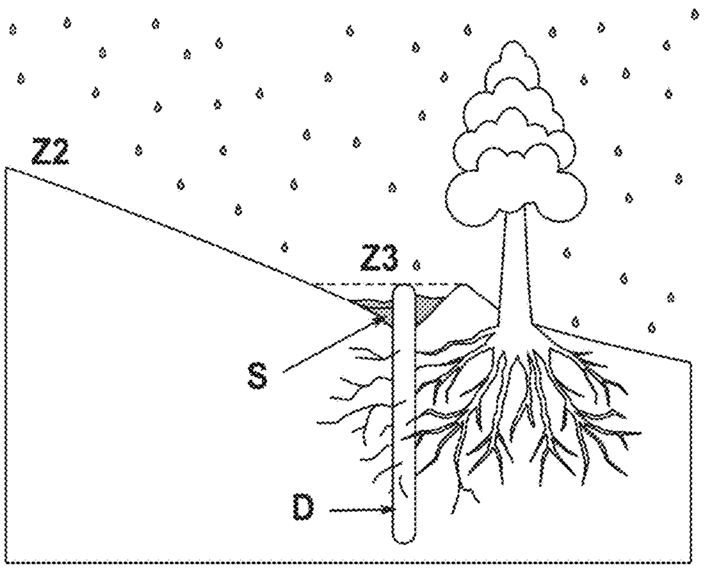
FIG. 9.—Schematic depiction of an embodiment of the system of the invention in which S represents the sediments accumulated in the artificially created microbasins, Z3.

In a particular embodiment of this system (FIG. 9), the ground is previously conditioned to form a microbasin (Z3) into which the slopes are directed towards the locations of the devices (D) of the invention.

If erosion and deposition of sediments(S) in the microbasin are controlled, the infiltration potential of the device will increase as the interconnection with the plant roots increases.

By means of using this device, the infiltration of rainwater at a specific point increases in a very significant manner. Furthermore, soil moisture also increases considerably.

Method for Increasing Crop Yields

In another aspect, the present invention relates to a method which allows increasing crop yields, hereinafter "method of the invention" comprising the location of the device of the invention in the ground adjacent to the plant such that the roots can absorb the moisture it generates.

Preferably the device of the invention is located at less than two metres from the trunk or stem of the plant, preferably less than one metre.

In a particular manner, the object of the invention relates to a method for increasing the oil yield of an olive tree which comprises locating at least one device of the invention at less than two metres from the trunk of the olive tree, preferably less than one metre from the trunk.

Surprisingly, by means of this method it is possible to increase the yield of olive trees by more than 74% and to increase the mean oil production above 280% in low rainfall regions.

Mode of Operation

To use the device of the invention (FIGS. 8 and 9), the following steps will be carried out:

- Creating a system of microbasins for collecting run-off water by means of a skimmer shovel, mouldboard plough, furrower, etc.
- Making a hole (by means of a hole digger, for example) suitable for the dimensions of the device of the invention at the lowest points of the microbasin (Z3), close to the root system of the crop plant to favour water circulation.
- Introducing the device of the invention (D) into the hole, such that the upper end is located at a height equal to the height of the microbasin. The rainwater receiving area in cases of considerable flooding of sediments(S) is thereby maximised.

In a preferred embodiment, to prevent the infiltrated water from evaporating as much as possible, the area of the microbasin is covered with a layer of biochar or with a layer of impermeable material or mulch (from pruning waste, pine bark, wood chips, etc.).

Embodiments of the Invention

The following examples and drawings are provided by way of illustration and are not intended to be limiting of the present invention. Furthermore, the present invention covers all the possible combinations of particular and preferred embodiments indicated herein.

In a first embodiment, the device of the invention is formed by a sheath consisting of a cylindrical jute mesh between 70 and 80 cm in height and 12 cm in diameter, with a mesh opening of 2 mm, closed at both ends and with a filling of biochar particles from olive tree and holm oak of about 20 mm in diameter.

In a second embodiment, the device of the invention is formed by a sheath consisting of a cylindrical mesh made of plastic between 50 and 70 cm in height and 15 cm in diameter, with a mesh opening of 10 mm, closed at both ends and with a filling of biochar particles from olive tree and holm oak of about 20 mm in diameter.

Test 1. Test on an Estate in Baena

To test this technology, 100 olive trees of the Picudauna variety from an estate in Baena in the area of "El Cerrillo" and "El Pingorotón" were selected.

The area of study is characterised by having a warm and xeric climate. There is a lot more rain in Baena in the winter than in the summer. According to Koppen and Geiger, the climate is classified as Csa.

In Baena, the mean annual temperature is 16.8° C. The approximate mean precipitation is 463 mm. The ETo or potential evaporation is 1289 mm, so if rainwater does not infiltrate at a depth, it becomes a very limiting resource for crop development as evaporation is 2.78 times greater than the available precipitation in the area.

The method of the invention was applied to 90 olive trees, placing a device of the invention at an approximate distance of one metre from each trunk, and 10 olive trees were used as a control (the method of the invention was not applied). Each device was placed 2 months before the start of each campaign.

Soil Moisture

To calculate the moisture of the soil, samples were collected by means of a metal cylinder with a volume of 273 $cm^3$ extracted 20 cm from the surface of the soil. Subsequently, said samples were weighed before and after drying at 105° C. for 24 hours to calculate the relative moisture with respect to dry weight. The following results were obtained (Table 1).

TABLE 1

| Moisture with respect to dry weight in % | | |
|---|---|---|
| Sample (Date) | With device of the invention (Mean of 90 soils) | Control. Without device of the invention (Mean of 10 soils) |
| Sep. 17 | 24.69 | 5.14 |
| Oct. 17 | 17.77 | 4.77 |
| Nov. 17 | 26.84 | 8.88 |
| Dec. 17 | 47.5 | 14.98 |
| Jan. 18 | 47.6 | 15.24 |
| Feb. 18 | 39.92 | 17.24 |
| Mar. 18 | 48.22 | 27.09 |
| Apr. 18 | 40.15 | 19.82 |
| May 18 | 32.69 | 6.77 |
| Jun. 18 | 31.19 | 5.15 |
| Jul. 18 | 13.05 | 3.04 |
| Aug. 18 | 5.44 | 3.14 |
| Sep. 18 | 16.03 | 4.21 |
| Oct. 18 | 41.8 | 19.68 |
| Nov. 18 | 48.23 | 17.96 |
| Dec. 18 | 58.86 | 11.47 |
| Jan. 19 | 23.26 | 14.91 |
| Feb. 19 | 36.71 | 6.14 |
| Mar. 19 | 26.73 | 4.3 |
| Total mean moisture | 32.98 | 11.05 |

A significant increase of 198% in soil moisture at a depth of 20 cm can be observed between olive trees with (32.98%) and without (11.05%) the device of the invention.

Infiltration Rate

To calculate the infiltration rate of water in the devices of the invention and compare it with control olive trees, the single ring method of 25 cm in diameter was used, and the following average flow rates were reached:

Infiltrator device: 1200 litres/hour

Control: 35 litres/hour

As can be seen, the use of the device of the invention greatly increases the infiltration of rainwater at a specific point (3329%)

Productivity

To calculate the yield of both the olive trees with the device of the invention and the control olive trees, equal-part samples of the average olive tree height of both types were collected.

TABLE 2

| Yields of oil in % of kilos of oil/kilos olives | | | |
|---|---|---|---|
| Sample | 2017-2018 campaign | 2018-2019 campaign | Average yield |
| Infiltrator | 21.56 | 20.72 | 21.14 |
| Control | 8.97 | 15.38 | 12.18 |

As can be observed in Table 2, there was a significant 74% increase in yield of the olives of the device of the invention (21.14%) with respect to control olives (12.18%).

Average Production Per Olive Tree in Kg Olive/Olive Tree

A selective collection of the harvest from both the olive trees with the device of the invention and the control olive trees was carried out, obtaining the following average productions:

Olive trees with the device of the invention: 48.86 kg olives/olive tree

Control olive trees: 22.31 kg olives/olive tree

Therefore, a significant increase in olive production of 119% of the olive trees with the device of the invention (48.86 kg) is observed with respect to control olive trees (22.31 kg). Furthermore, if the difference in yields is added to this, the following results in total kilograms of oil are obtained:

Olive trees with the device of the invention: 48.86 kg with 21.14% of oil→10.33 kg of oil/olive tree.

Control olive trees: 22.31 kg with 12.18% of oil→2.72 kg of oil/olive tree

In conclusion, an increase of 280% in kg of oil was achieved if olive trees with the device of the invention (10.33 kg) are compared to the control olive trees (2.72 kg)

Test 2. Effects of the Biochar Particle Size on the Infiltration Rate after One Water Year from its Installation in the Soil of the Olive Tree Grove In parallel to the implantation of the infiltrator device in the Baena pilot estate, a trial-and-error experiment was carried out to determine the ideal size of the biochar particles with respect to the infiltration capacity of water into the soil.

To that end, 30 olive trees with similar characteristics in terms of type of tree, age, and type of soil (carbonated-clayey) were selected. In these thirty samples, three types of infiltrator devices (differing only in the size of the biochar fragments) were randomly implanted, with ten olive trees for each infiltrator device.

These infiltrator devices were implanted in September of 2016. The infiltration rate study was performed in September of 2017, therefore leaving a year of implantation to study the effects of what has been referred to as "maturation". This maturation implies, on the one hand, the capture of the infiltrator device by the root system of the olive tree (generation of the preferred pathways for the movement of water in the soil), and on the other hand, the possibility of sealing due to the accumulation of fine particles of soil entrained by run-off water. In the water year 2016-17, the number of torrential rain events in the area of study was 13. This information corresponds to the Baena weather station.

The field determination of the infiltration rate was performed using a double ring infiltrometer tailored to the diameter of the infiltrator devices.

Sub-sample 1: infiltrator devices comprising a plastic sheath with a mesh size of 10 mm, filled with biochar particles of a size between 20 and 60 mm. The infiltration rate for this sub-sample was 1200 litres/hour, with a standard deviation of ±98 L/h.

Sub-sample 2: infiltrator devices comprising a plastic sheath with a mesh size of 10 mm, filled with biochar particles of a size between 10 and 20 mm. The infiltration rate for this sub-sample was 430 litres/hour, with a standard deviation of ±17 L/h.

Sub-sample 3: infiltrator devices comprising a plastic sheath with a mesh size of 10 mm, filled with biochar particles of a size between 2 and 10 mm. The infiltration rate for this sub-sample was 35 litres/hour, with a standard deviation of ±9 L/h.

The result allows to conclude that the infiltration rate after one year from installing the infiltrator device is conditioned by the biochar particle size, being preferable a particle size between 20 and 60 mm. In this year, it has been observed how the clogging and filling of the infiltrator device due to the accumulation of fine particles entrained by the infiltrating water dramatically affected the infiltrator devices filled with small particles.

Test 3. Effects on Soil Moisture Derived from the Nature of the Sheath (Mesh). Comparison Between Devices with a Sheath Made of Jute, Plastic, or Metal.

Measurements of soil moisture have also been taken in situ at the Baena experimental estate in order to test the capillary effect of the sheath (mesh). This experiment was designed to demonstrate the hypothesis that textile sheaths have a capillary effect which aids in the evaporation of water from soil and, therefore, is contrary to the objective of the infiltrator device (introducing and preserving water in the soil for the maximum time possible so that the plant can use it).

The experiment lasted for 15 days. 100 litres of water were infiltrated at 18 different locations, all in olive tree grove microbasins (ponds) with an infiltrator device: 6 in which the sheath of the device was manufactured from jute, 6 in which the sheath was manufactured from plastic and 6 with a metallic sheath.

A moist soil sample was collected at a depth of 20 cm and at 20 cm from the infiltrator device, at the following times: after 30 minutes and after 15 days. The results are shown in Table 3.

It can clearly be seen that the soils in which the sheath of the infiltrator device is manufactured with a textile material (jute) less water is retained than when the sheath is manufactured with plastic or metal (about 2% less). This result can be interpreted according to the "evaporator" effect of the textile material (jute) generated by its capillarity (derived from its organic nature, which is a unique environmental advantage), compared to plastic or metal which are not capillary.

TABLE 3

| Mean values (and standard deviation) of moisturea of the soil collected at a depth of 20 cm and at 20 cm from the infiltrator device by using different combinations of devices | | | |
|---|---|---|---|
| Type of sheath | Type of device filling | 30-minute moisture[a] (%) Mean ($\pm\sigma_{n-1}$) | 15-day moisture[a] (%) Mean ($\pm\sigma_{n-1}$) |
| Textile (jute) | Biochar | 62.1 ± 0.9 | 45.1 ± 0.4 |
| | Biochar + gravel | 62.7 ± 0.4 | 56.4 ± 0.1 |
| Plastic | Biochar | 62.6 ± 0.7 | 47.3 ± 0.5 |
| | Biochar + gravel | 62.5 ± 0.4 | 58.1 ± 0.2 |
| Metal | Biochar | 62.9 ± 0.4 | 46.9 ± 0.6 |
| | Biochar + gravel | 62.8 ± 0.3 | 57.8 ± 0.3 |

aMoisture with respect to dry weight of the soil at 105° C.

Test 4. Effects on Soil Moisture Derived from the Placement of a Layer of Non-Capillary Material (Gravel) in the Dome of the Infiltrator Device. Study of the "Mulch Effect"

Also at the experimental estate, in parallel to the previous experiment and using the same methodology, the effect of filling the dome of the infiltrator (aerial or not buried part thereof) with a thick, non-capillary material on soil moisture was studied. In this experiment, round limestone gravel with a mean size of 4 cm was used. The results are shown in Table 3.

It is also clearly shown that, after 15 days, the soil retains more water (about 11% more) when infiltrator devices contain gravel in the upper part. This is explained by the "mulch effect" exerted by the gravel. This effect is explained by the low capillarity of gravel, which even further contributes to the breakage of the capillary fringe with the inside of the infiltrator device, thereby preventing surface evaporation of the water contained inside the infiltrator device and that of the soil surrounding it. In turn, the drying of the biochar, as it is a porous material, would entrain water from the soil and part of the infiltrate could be lost due to evaporation. Water is thereby retained in the soil for a longer time and is therefore available to the plant (which is the objective of the invention).

Experiments 2 and 3 can be better adapted to the real problem of water loss due to evaporation on the soil surface, if it is considered that the potential evaporation greatly depends on temperature. Therefore, Table 4 shows the daily evaporation data for the months of the water year 2017-2018, according to the data reported by the Baena weather station. The results of experiments 2 and 3 correspond to the month of June, where daily evaporation is 5.68 litres per square metre. The evaporation data in the different months of the year will influence the results shown in Table 3, where the differences are greater as the higher said evaporation rate is. The use of gravel or other materials with lower capillarity than the biochar for the filling of the upper part (or the dome) of the infiltrator device is therefore recommended.

TABLE 4

Water losses due to evaporation in the different months of the water year 2017-2018

| Month and year | Water losses due to evaporation (litres/$m^2$/day) |
|---|---|
| Sep. 2017 | 4.38 |
| Oct. 2017 | 2.65 |
| Nov. 2017 | 1.34 |
| Dec. 2017 | 0.52 |
| Jan. 2018 | 0.96 |
| Feb. 2018 | 1.67 |
| Mar. 2018 | 2.21 |
| Apr. 2018 | 3.37 |
| May 2018 | 4.24 |
| Jun. 2018 | 5.68 |
| Jul. 2018 | 6.84 |
| Aug. 2018 | 6.35 |

Test 5. Study of the Behaviour of the Infiltrator Device Coupled to Drip Irrigation The experiment was performed between May 1 and Oct. 1, 2019, in an olive tree grove plot with drip irrigation located in the municipality of Deifontes (Granada). The installation of the infiltrator devices in a total of 100 olive trees was tested in this plot. The water flow rate used was 8 litres per hour for 12 hours once per week. Irrigations in this plot start in the month of May and end in October. It is, therefore, a clearly deficient irrigation.

The problem with this form of irrigation is that puddles of water with a surface of about 1.5 $m^2$ are formed around the impact point of the water supplied by the irrigator device with the soil.

When the dripper was coupled to an infiltrator device with a gravel dome, the puddle of water completely disappeared.

Considering that the average evaporation rate in Deifontes between the months of May to October is 5.79 L/$m^2$/day, and according to the average temperature data reported by the nearest weather station (Iznalloz), 60.8 litres of water are evaporated per week in 1.5 $m^2$ of puddle.

Moreover, when a flow rate of 8 litres is applied for 12 hours once per week, the quantities of irrigation water are 96 litres.

Comparing the two previous numbers, it can be asserted that the irrigation yield (the water actually available to the olive tree) is 36.7%. In other words, the 63.3% of the irrigation water (deficient a priori) is lost due to evaporation. The infiltrator device, therefore, represents an enormous improvement for this type of irrigation as it prevents the accumulation of water on the soil surface.

The invention claimed is:

1. A device for facilitating an infiltration of water into a ground, the device comprising:
- a substantially cylindrical sheath comprising:
  - a water-permeable wall;
  - a bottom part defined by a majority of a length of the water-permeable wall;
  - a top part defined by a minority of the length of the water-permeable wall;
- a plurality of biochar particles having a size of between 2 and 100 mm, housed in the bottom part, and
- a plurality of particles of non-capillary material housed in the top part;

wherein:
- the non-capillary material is non-capillary gravel;
- the bottom part is configured to be placed substantially fully into the ground;
- the top part is configured to be substantially uncovered by the ground when the bottom part is placed into the ground; and
- the water-permeable wall fully encloses the plurality of biochar particles and the plurality of particles of non-capillary material.

2. The device of claim 1, wherein the size of the biochar particles is between 5 mm and 30 mm.

3. The device of claim 1, wherein the size of the biochar particles is between 30 and 60 mm.

4. The device of claim 1, wherein the sheath is made of a non-capillary material.

5. The device of claim 1, wherein the sheath is made of plastic.

6. The device of claim 1, wherein the sheath has a size of between 5 and 40 cm in diameter, and between 10 and 200 cm in length.

7. The device of claim 1, wherein the sheath includes openings having a diameter of between 1 and 50 mm.

8. The device of claim 1, wherein the sheath is a mesh with an internode space or opening greater than 1 mm.

9. The device of claim 1 further comprising fertilizers, plant growth promotors, or other agrochemicals inside the sheath.

10. The device of claim 9 further comprising deblocking fertilizer inside the sheath.

11. The device of claim 1 further comprising one or more elements located in an upper part of the device projecting from the sheath suitable for preventing the device from sinking.

12. The device of claim 11 further comprising a plurality of bars going through the sheath in a manner substantially perpendicular to a longitudinal axis of the sheath.

13. The device of claim 1 further comprising a substantially frustoconical element fixed at its smaller base to an upper part of the device.

14. The device of claim 1 further comprising a conduit, suitable for conducting water, joining an inside of the sheath with an outside of the sheath.

15. The device of claim 14 further comprising a dripper or diffuser, located inside the sheath and connected to the conduit.

16. The device of claim 1, further comprising in an upper part a first dome, wherein the first dome is a permeable dome, with a diameter greater than a diameter of the sheath.

17. A method for increasing a crop yield, the method comprising placing, in a substantially vertical manner, at least one device according to claim 1 at a distance of less than 2 meters from a trunk or a stem of a plant.

18. The method of claim 17, wherein the at least one device is placed at a distance of less than 1 meter from the trunk or stem of the plant.

19. The method of claim 17, wherein the plant is an olive tree.

20. A method for increasing infiltration of water into subsoil, the method comprising:

creating a system for collecting run-off water, the system comprising a plurality of microbasins, each microbasin comprising a lowest point and a height;

making a hole at the lowest point of each microbasin, and introducing one of the devices of claim 1 in each hole, such that an upper end of the device is located at a height equal to the height of the microbasin.

21. The method of claim 20 further comprising covering the microbasin with an impermeable material or with a mulch.

22. The device of claim 1 further comprising in an upper part a dome, made of non-capillary material, which diminishes evaporation of water.

* * * * *